S. B. Stillwell.
Tailoring.

Nº 4083. Patented Jun 20, 1845.

UNITED STATES PATENT OFFICE.

SYLVANUS B. STILWELL, OF BROOKLYN, NEW YORK.

CUTTING GARMENTS.

Specification of Letters Patent No. 4,083, dated June 20, 1845.

*To all whom it may concern:*

Be it known that I, SYLVANUS B. STILWELL, of Brooklyn, in the county of Kings and State of New York, have invented a new and useful System of Using Patterns for Cutting Garments; and I do hereby declare that the following is a full, clear, and exact description thereof, reference being had to the accompanying diagrams, in which—

Figure 1:
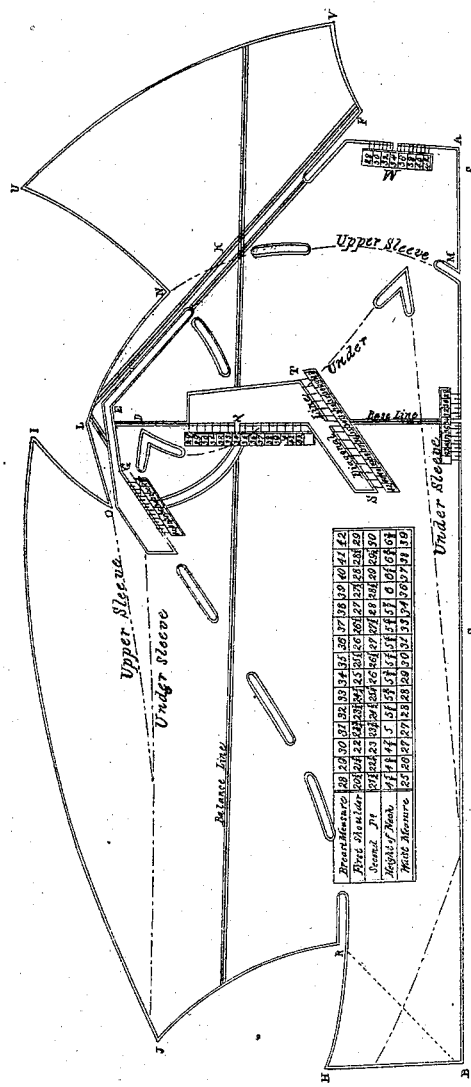
Figure 2:
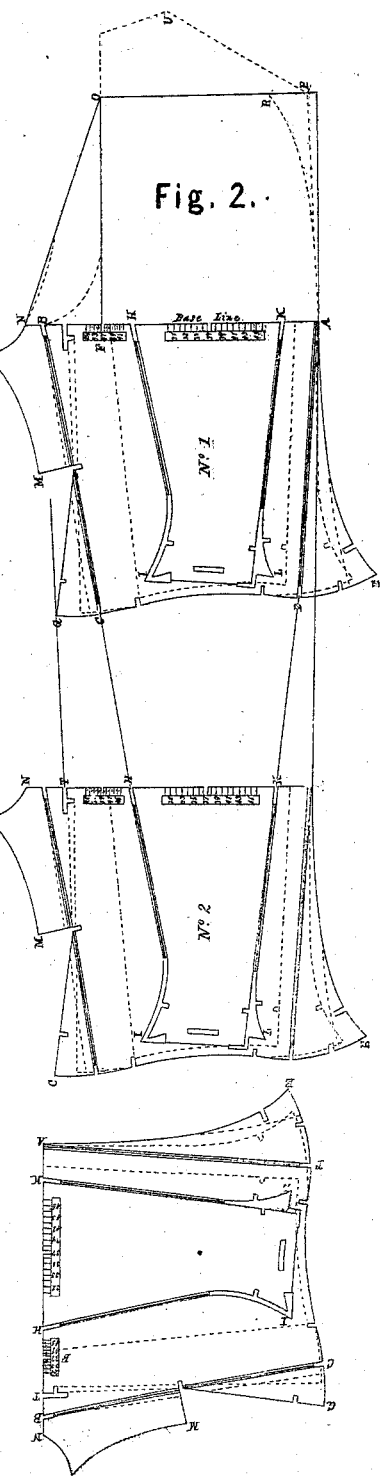

Figure 1 is a representation of a coat pattern. Fig. 2 is a pattern for pantaloons with an outline of the draft.

Heretofore it has been essayed to construct patterns for cutting garments but to effect it the pattern had to be varied to every size, for this purpose series of holes have been made in paste board with the number corresponding to the size stamped beside them, in this way a variety of patterns are in fact formed on one, but the nature of my invention consists in forming a pattern of medium size and on right lines on said pattern to form a scale which together with a diagonal one will serve to cut a coat or other garment of any desired size or shape always insuring the same style of dress in each case without a multiplicity of patterns.

The construction is as follows: I form out of a paste board or other suitable material an exact pattern of the front of the style of coat to be made of medium size, the front part of said pattern being cut off on the straight line A, B, of Fig. 1, about half way between the balance line and the front; the arm "scye" from U around the curved line to I being filled up enough to form the back pattern, but points in its line are preserved by slits through the paper as distinctly shown on the drawing and the outline of the back is also formed in a similar way by slits. The pattern for the upper sleeve is marked in a blue outline, and the undersleeve is in a red outline, marked on the same pattern with proper points for marking through cut out of the pasteboard; at the front of the "scye" at $x$ I draw a perpendicular line which I denominate the balance line from top to bottom of the pattern. At right angles to this line, on the same point $x$, a base line is drawn; an oblong slit is cut in the pattern at this point, on a line with the base line extending each way and a scale is marked on it; at the front end of this slit it is intersected by a diagonal one S T on the front edge of which there is another scale marked and at the upper end of the back pattern is a scale W about the center of the neck line; a fourth scale is on the line A B crossing the base line; the two first named scales and the last, are notched on the lines where they cross them, and from those points all the measures are taken for placing the pattern as set forth in the directions attached thereto.

The table by which these scales are used is made on the pattern and is composed of a series of the various measures to fit different forms, with their corresponding index or breast measures at top in a line and under said indices the other measures in regular succession in the ordinary way. To use the above named table in connection with the scales, reference should be had to the directions on the sheet marked A but is not required in the description of construction.

The pattern for pantaloons is on the same general principle; the outline being made by the pattern assisted by the scale it therefore needs no particular description.

Having thus fully described my improvements and pointed out their uses what I claim as my invention and desire to secure by Letters Patent is—

The combination of a pattern in any style for cutting garments, with scales for regulating the sizes thereof substantially in the manner herein set forth.

S. B. STILWELL.

Witnesses:
J. J. GREENOUGH,
J. H. GODDARD.